United States Patent [19]

Rozmovits

[11] Patent Number: 5,317,719
[45] Date of Patent: May 31, 1994

[54] SYSTEM FOR FORMING SERIAL M-BIT INFORMATION INTO BLOCKS WHOSE LOCATIONS CORRESPOND TO BITMAP LOCATIONS

[75] Inventor: Bernard A. Rozmovits, Londonderry, N.H.

[73] Assignee: Digital Equipment Corporation, Maynard, Mass.

[21] Appl. No.: 29,936

[22] Filed: Mar. 11, 1993

Related U.S. Application Data

[63] Continuation of Ser. No. 438,036, Nov. 20, 1989, abandoned.

[51] Int. Cl.⁵ .......................................... G06F 12/06
[52] U.S. Cl. ................................. 395/425; 395/500; 364/238.7; 364/239.2; 364/246.3; 364/254.3; 364/255.7
[58] Field of Search .............. 395/250, 400, 425, 500; 370/99

[56] References Cited

U.S. PATENT DOCUMENTS

| | | | |
|---|---|---|---|
| 3,587,044 | 6/1971 | Jenkins . . | |
| 3,742,456 | 6/1973 | McFiggans et al. . | |
| 4,408,272 | 10/1983 | Walters . | |
| 4,419,728 | 12/1983 | Larson | 395/325 |
| 4,424,565 | 1/1984 | Larson . | |
| 4,495,574 | 1/1985 | Hofstetter . | |
| 4,554,659 | 11/1985 | Blood et al. | 370/88 |
| 4,683,534 | 7/1987 | Tietjen et al. . . | |
| 4,760,378 | 7/1988 | Iketani et al. | 341/59 |
| 4,779,190 | 10/1988 | O'Dell et al. . . | |
| 4,852,089 | 7/1989 | Berry et al. | 370/95 |
| 4,860,200 | 8/1989 | Holmbo . | |
| 4,916,603 | 4/1990 | Ryan et al. | 395/425 |
| 4,943,936 | 7/1990 | Hirai et al. | 364/519 |
| 4,949,246 | 8/1990 | O'Dell et al. . . | |
| 4,959,773 | 9/1990 | Landers, Jr. . . | |
| 4,992,931 | 2/1991 | Hirasawa | 395/500 |
| 5,056,012 | 10/1991 | Spiotta et al. | 395/425 |
| 5,060,229 | 10/1991 | Tyrrell et al. | 370/110.1 |
| 5,068,823 | 11/1991 | Robinson | 395/500 |

*Primary Examiner*—Parshotam S. Lall
*Assistant Examiner*—Krisna Lim
*Attorney, Agent, or Firm*—Kenyon & Kenyon

[57] ABSTRACT

A circuit is provided for forming fixed length blocks of information units received from one network for transfer to another. The actual information from each serially received information unit is stored in a receive buffer. A block header register is provided to store the logical channel number, block byte count, and a bit map having locations corresponding with each of the actual information units stored in the receive buffer. Once all of the information units have been received, the header register provides its output to the receive buffer for storage in a header location. The receive buffer thus forms a fixed length block which can be transferred to another network for processing.

11 Claims, 2 Drawing Sheets

SYSTEM FOR FORMING SERIAL M-BIT INFORMATION INTO BLOCKS WHOSE LOCATIONS CORRESPOND TO BITMAP LOCATIONS

This is a continuation of application Ser. No. 07/438,036 filed Nov. 20, 1989, now abandoned.

FIELD OF THE INVENTION

This invention relates to a format for representing data and, more particularly, to a circuit for efficiently formatting a fixed number of serially received information units into a single block for transmission.

BACKGROUND OF THE INVENTION

The communication of "information units" between separate computers or computer networks often requires a reformatting of the information contained in the information units. These information units generally contain a number of bits of either data information, control information or null information along with a bit or set of bits for identifying the type of information.

For example, information units delivered from a first computer or computer network may contain m-bits wherein m=9, bits $<m-1:0>$, contain the "actual" information and bit $<m>$ indicates the type of information. The 9 bits $<m:0>$ can be sent serially to a "server" interface for a second computer or computer network. A server is a part hardware and part software device designed to perform a specific function for a number of "clients" in a network. A client is the software operating a device such as a computer or an intelligent peripheral forming a part of the second network.

This second network can be, for example, a byte (8-bit) oriented network requiring n-bit information units wherein n=8. The m-bit information units sent from the first network must be reformatted into n-bit information units for processing by the n-bit second network. Further, the first network may require that only groups or "packets" of information units be forwarded over a serial line to the second network at one time.

A known system processes packets of serially received m-bit information units by storing the information units and then expanding each m-bit information unit into a 16 bit word using a 16 bit latch, the output of which is fed to the n-bit network. The n-bit network can then operate on the word as two separate bytes of information. This approach has the disadvantage of requiring more memory to expand the 9-bit (m=9) values into 16-bit words prior to transmission.

The 16-bit information units can then be processed, one at a time, by a client in the byte oriented network. The client must individually determine for each 16-bit information unit whether the actual information in that information unit is user data, control information, or null data. This decreases the processing efficiency of the client as well as requiring more available memory space for expanding the m-bit information units into 2n-bit information units.

There is therefore a need for a data representation which allows efficient processing of a fixed number of received information units.

SUMMARY OF THE INVENTION

The present invention overcomes these problems by forming a fixed length packet of serially received information units into a block which can then be transmitted to a client for subsequent processing.

In the block formations of the present invention, the bit or bits that indicate whether the information is control or data are collected for each information unit that is serially received in the packet from the m-bit network. The collection occurs at a device, e.g. a data communication server, in which the information units are converted into the block. The indicator bit or bits are stored in a block header as a control/data bitmap. The remaining bits (the actual information) are stored in sequential locations in the block, each location corresponding with the location of its control/data bit or bits in the control/data bitmap.

A fixed length block (corresponding to the number of information units in a packet) of information is therefore assembled in the data communication server and stored in the server memory. The block can then be transmitted to the desired "client" in the n-bit network for processing, but preferably, the block is converted into a variable length block before being sent to the n-bit network as described in copending application Ser. No. 439,239, now U.S. Pat. No. 5,175,817 filed on even date herewith, the disclosure of which is hereby incorporated by reference.

While in this description, the data communication server is shown as part of the n-bit network coupled directly to the m-bit network, it is understood that the data communication server could: couple with the other network through another server; independently couple the two networks; or be a part of the m-bit network.

In most instances, because data information tends to be grouped together for transmission, a block will be entirely filled with data information units. Similarly, it is possible to have a block consisting entirely of control information units. Because the location of each bit or bits in the control/data bitmap corresponds to a specific location in the assembled block, a bitmap having only logical "zeroes" (representing all control information units) or having only logical "ones" (representing all data information units) indicates to the clients that they can process the entire block of information as either control information or data information, respectively. Thus, the clients of the n-bit network only need to look at the control/data bitmap in the header in order to process the entire block of information. As mentioned above, however, it is preferable to convert the block of the present invention into another, variable size, block in accordance with application Ser. No. 439,239, incorporated by reference above.

Because the packets of information units are multiplexed onto a serial line when delivered from the m-bit network to the data communication server, a channel number is necessary to identify the sender of the packet. The block therefore further includes a channel number field in its header. The channel number field stores the number of the channel (in the protocol of the m-bit network, the channel number is always the first information unit in the packet and is the only information unit not having a control/data indicator) on which the packet was received over the serial line.

In an embodiment of the present invention, the header of the block further includes a valid information unit counter field which stores a count of the actual information received in the packet. A counter is incremented for each actual information unit received in the packet. Because the packets are of a fixed length, the m-bit network must sometimes fill the packet with null information units prior to delivering the packet over the serial line. By knowing the value of the counter field and the total number of information units in the block, the number of null information units can also be determined.

DETAILED DESCRIPTION

Figure 1:
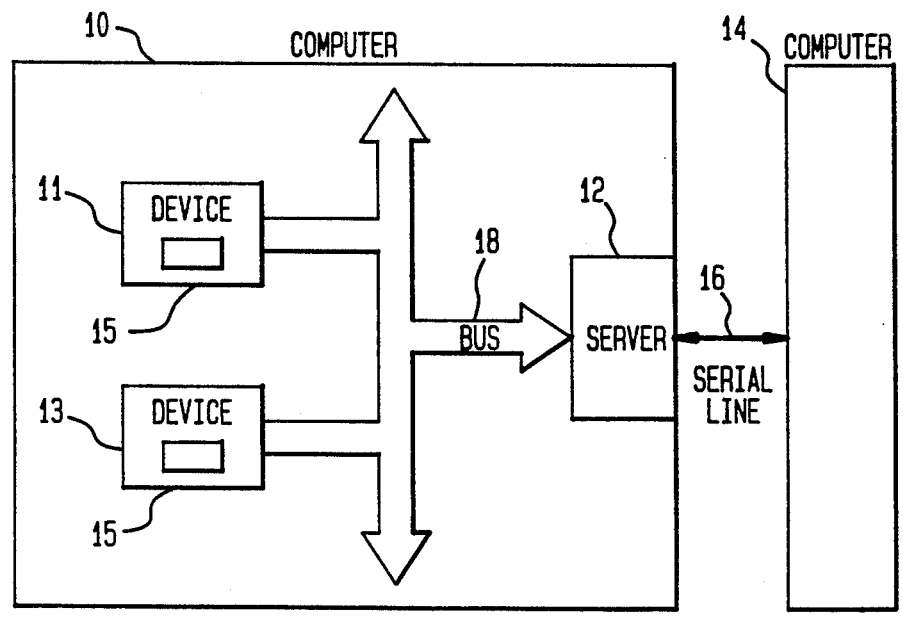
FIG. 1 is a block diagram of the environment in which the present invention operates.

Referring to FIG. 1, there is shown a block diagram of an environment in which the present invention operates. A first computer or computer network 10 includes a bus 18, e.g., an Ethernet bus, coupling a plurality of devices 11, 13 to a server 12. The data communication server 12 is further coupled over a high capacity serial line 16, e.g., optical fiber, hardwired line, etc., to a second computer or computing network 14. The network 14 supplies fixed length "packets" of information units from one network over the serial line 16 to communicate with the other network. While the discussion herein relates to only one communication over serial line 16, it is to be understood that information may be communicated over one of several channels on the serial line 16 in a multiplexed fashion thus requiring a channel number indicator in the packet.

The protocols for each of the networks 10, 14 require inputs of different sized data For example, network 10 may include n-bit or byte (n=8) oriented devices 11, 13. In other words, the devices 11, 13 operate on 8-bit boundaries of information, e.g., bytes, words or longwords. Network 14 on the other hand, delivers m-bit information units having 8 bits of information and one bit that indicates the type of information (m=9).

In order for network 14 (hereinafter the "m-bit network") to communicate with the network 10 (the "n-bit network"), the data communication server 12 functions to provide an efficient data representation for a fixed length packet of m-bit information units received from m-bit network 14 over the serial line 16. This data representation (along with header information) is referred to as a "block" of information. The data communication server 12 receives a packet of m-bit information units over serial line 16 from the m-bit network 14. The data communication server's hardware (FIG. 3) then formats the m-bit information units into a block for efficient handling by the n-bit network 10.

One example of a fixed length packet has seventeen information units, including a channel number information unit and sixteen m-bit control, data, or null information units. This fixed length packet is then forwarded over serial line 16 to the data communication server 12. Each packet of information units is used to formulate one block.

Aside from the first information unit in the packet i.e., the logical channel number, each successive m-bit information unit includes (m-1) bits of either control or data information. The $m^{th}$ bit is used to indicate whether the remaining (m-1) bits are either control or data. Only the logical channel number is a full m-bits wide. For example, if the $m^{th}$ bit is set equal to 1, then the information unit is a data information unit. Alternately, if the $m^{th}$ bit equals 0, then the information unit contains control information. Further, because each packet must contain seventeen information units, the network 14 will sometimes deliver null information units. Once a null information unit is sent, all remaining information units necessary to fill the packet must also be null units.

Figure 2:
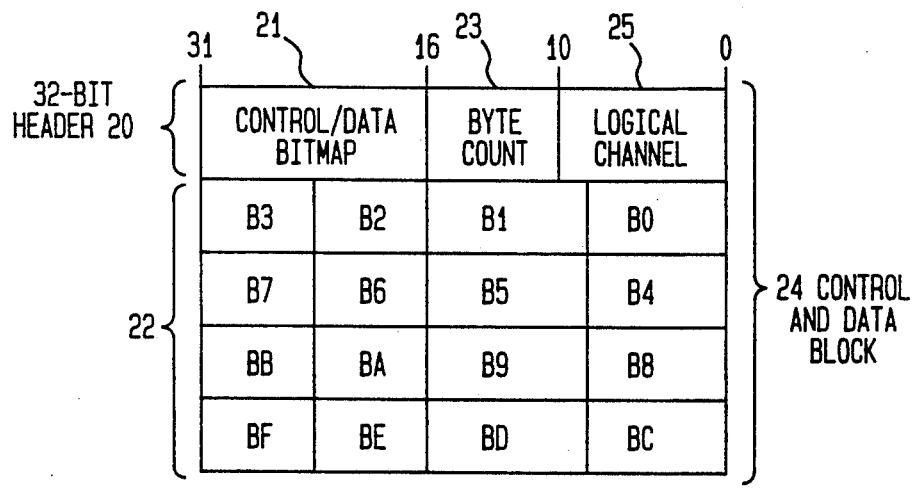
FIG. 2 is a diagram illustrating an embodiment of the data format of the present invention.

FIG. 2 is a diagram illustrating an embodiment of the data representation formed by the data communication server 12 in the present invention. The block 24 comprises five "longwords", i.e., a 32-bit word, including a 32-bit header 20. The header 20 includes three fields: logical channel number 25, bits <10:0>, valid information unit counter 23, bits <15:11>, and a control/data bitmap 21, bits <31:16>. The remaining portion 22 of the block 24 contains sixteen information units (BO-BF) arranged into four 32-bit longwords. Each of the sixteen bits in the control/data bitmap 21 located in the header 20 corresponds to a location of one of the information units (BO-BF) in the block 24. The valid information unit counter 23 keeps track of the number of information units in each block which do not contain null information.

When constructing the block 24 from a packet received from the m-bit network 14, the data communication server 12 first receives the logical channel number information unit and stores it in header 20. Following receipt of the logical channel number information unit, the next m-bit information unit in the packet is received by the data communication server 12. The mth bit (indicating whether it is control or data information) of that information unit is collected and stored in the control/data bitmap 21 and the remaining (m-1) bits of "actual" information are placed in the block 22 at location BO. This continues for all the m-bit information units received in the packet. Once all seventeen information units have been received, then the block 24 is fully formatted. The logical channel number 25, all sixteen control/data bits contained in the control/data bitmap 21 and the valid information unit counter value 23 can then be sent to the n-bit network 10 or converted to another block for transmission to a client as described in U.S. Pat. No. 5,175,847, incorporated by reference above.

Figure 3:
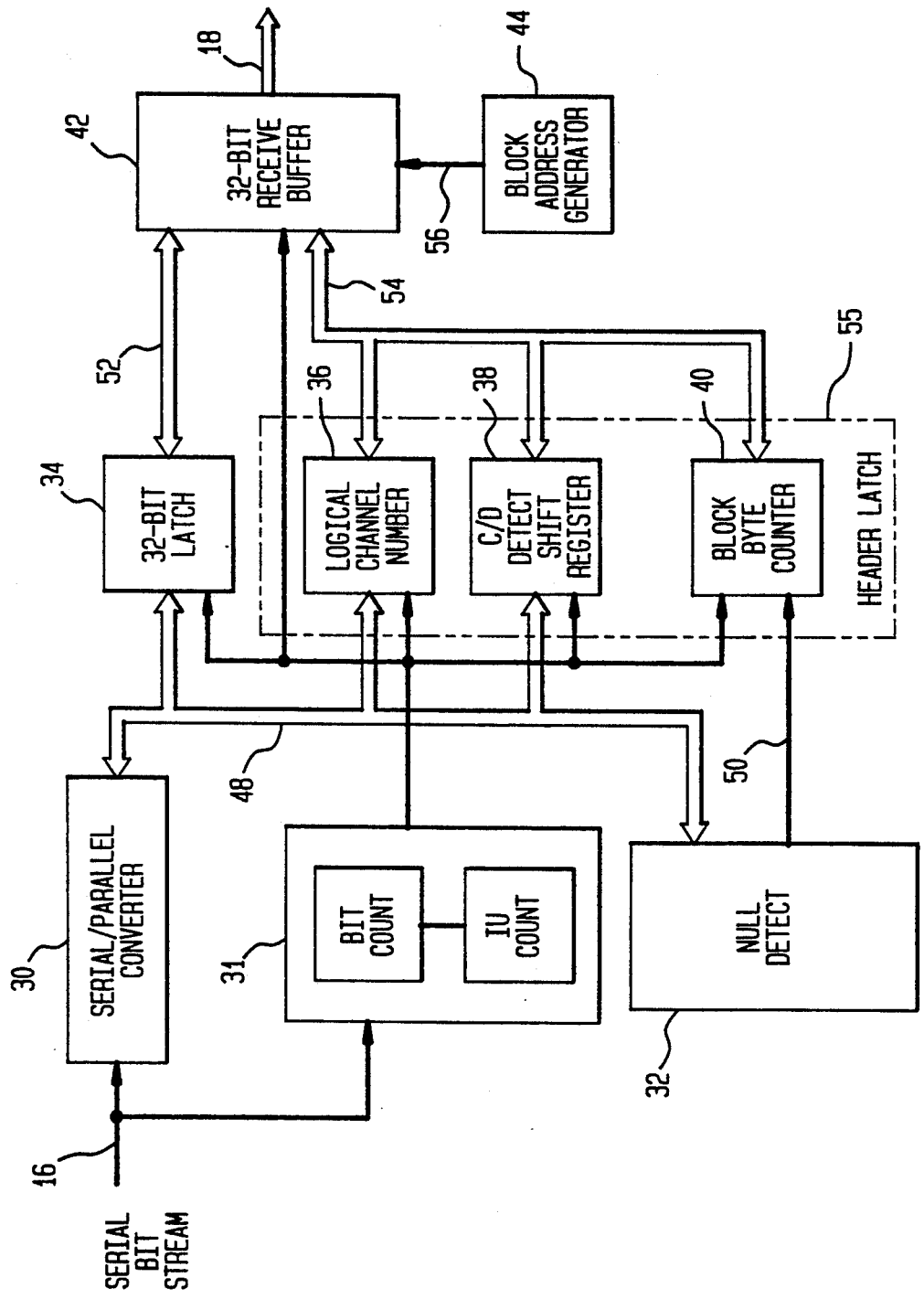
FIG. 3 is a block circuit diagram of apparatus for formatting data according to the present invention.

FIG. 3 is a block diagram of the hardware located in the data communication server 12 for creating the blocks 24. Each packet containing the seventeen information units is received by the serial/parallel converter 30 via the serial line 16.

Figure 4:
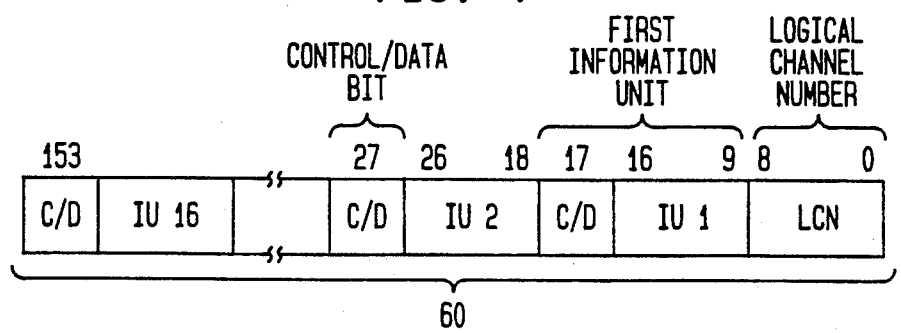
FIG. 4 is an embodiment of a packet of the invention.

Referring to FIG. 4, there is shown an embodiment of a packet 60. In keeping with the discussed example, the packet 60 has seventeen information units $IU_0$-$IU_{16}$ arranged serially as bits 0 through 153. The first information unit $IU_0$ contains the logical channel number (LCN). Information units $IU_1$-$IU_{16}$ each contain 9-bits, e.g. bits <7:0>, of information and a single control/data bit <8>. The packet 60 is output from the m-bit computer 14 (FIG. 1) to the serial/parallel converter 30 via the high capacity serial line 16.

Referring back to FIG. 3, the serial/parallel converter 30 provides a parallel output of the received information units on bus 48. The bus 48 is coupled to a 32-bit latch 34, a header latch 55 and a null detector 32. The header latch 55 includes a logical channel number register 36, a control/data (C/D) detect shift register 38 and a block byte counter 40.

The logical channel number register 36, C/D detect shift register 38 and a valid information unit counter 40 are all coupled to a 32-bit receive buffer 42. The 32-bit latch 34 is also coupled to the 32-bit receive buffer 42. Further, a block address generator 44 provides block addresses via line 56 to the receive buffer 42. The output from the receive buffer 42 is a five longword block which is provided to a direct memory access (DMA) controller (not shown) of the server. The receive buffer 42 stores the entire block before providing it to the DMA controller.

A control circuit 31 is provided to enable the latch 34, registers 36, 38, 40 and receive buffer 42 to receive the proper information from the information units at proper times as described in the operation. The control circuit 31 receives its input from the serial bit stream 16 and provides output signals to the respective registers and latches. The control circuit 31 can include a bit counter which increments up to the size of each information unit and then signals an information unit counter which is incremented for each information unit received. The outputs of these counters are provided to the latches and registers of the circuit in accordance with the circuit operation.

In operation, each information unit is provided as an input to the 32-bit latch 34, logical channel number register 36, C/D detect shift register 38 and the null detector 32. Because the first information unit, $IU_0$, is known to contain the logical channel number, the logical channel number register 36 stores the first information unit.

The next m-bit information unit, IUI, is then provided to the 32-bit latch 34, C/D detect shift register 38 and null detector 32. The C/D detect shift register 38 stores the $m^{th}$ bit of the information unit $IU_1$, indicating whether the information is data or control information. The 32-bit latch 34 stores the information unit bits $<m-1:0>$ in its lower ordered bit locations. Once the data from four information units $IU_1-IU_4$ have been provided to the latch 34, thus filling up the 32-bit locations, (e.g. $IU_1$-bits $<7:0>$, $IU_2$-bits $<15:8>$, $IU_3$-bits $<23:16>$ $IU_4$-bits $<31:24>$, the latch 34 provides the data as a single 32-bit longword output to the 32-bit receive buffer 42. Preferably, however, the latch 34 stores only one information unit (bits $<m-1:0>$) and provides that information unit to the receive buffer 42 prior to receiving the next information unit. The receiver buffer 42 is thus filled with a longword of information units after four information units have been received. The longword is stored in an address location provided by the block address generator 44. Therefore, bits $<m-1:0>$ of each of the information units $IU_1-IU_4$ are now stored in block locations B0-B3 as shown in FIG. 2.

The C/D detect shift register 38 shifts each control/data bit obtained from each information unit through the shift register 38 as the information units $IU_1-IU_{16}$ are received. The null detector 32 determines whether the information units contain actual information, i.e., either control or data information. The null detector 32 provides a signal on line 50 to the valid information unit counter 40 for each actual information unit received. The valid information unit counter 40 counts the number of signals from the null detector 32 to provide a count of the actual information units contained in the block 24.

Once the last information unit $IU_{16}$ is processed through the circuit of FIG. 3, the 32-bit latch 34 provides the fourth longword of information as an input to the 32-bit receive buffer 42. Or, alternatively, the latch 34 forwards the last information unit to the receiver buffer to make up the final longword. At the same time, the logical channel number register 36, valid information counter 40, and C/D detect shift register 38, are all filled and thus the header latch 55 is complete. The header latch 55, e.g. logical channel number register 36 places bits in locations $<9:0>$, valid information unit counter 40 places bits in locations $<15:10>$ and C/D detect shift register 38 places bits in locations $<31:16>$ is then provided as an input to a header address location in the 32-bit receive buffer 42, this header address being provided by the block address generator 44. Each bit in the C/D bitmap 21 corresponds with an information unit B0-BF comprising the longwords stored in the receive buffer 42 and indicates whether its respective actual information unit B0-BF contains data or control information.

Because the longwords are formed in contiguous address locations in the 32-bit receive buffer 42 prior to the header information being completed, the block address generator 44 must write the header information into the first address location in the block. The header information is output in parallel on bus 54 from the header latch 55 to the first address in the block. The receive buffer 42 will then contain a five longword block. The block of data is then output on bus 18 to the direct memory access controller for the server 12.

By the above described method, the data communication server 12 formats a fixed length block of information in an efficient data representation. If all the information units in a single block are either control, data, or null information, then by making reference to the block header for that block, the entire block of information can be processed at once by the data communication server's processor (not shown). This greatly improves the efficiency of the server's processor which previously had to check the $m^{th}$ bit of each information unit received in the packet. As a result, a slower and less expensive processor can be used in the data communication server 12.

Further, there is a dramatic reduction in the server memory necessary to implement the conversion from m-bit information units in the m-bit network 14 to n-bit information units for the n-bit network 10.

What is claimed:

1. A method of formatting m-bit information units sent by an m-bit network into a block, each m-bit information unit including a control/data indicator and actual information corresponding to the respective control/data indicator, each control/data indicator indicating whether the corresponding actual information in the information unit is control information or data information, the method comprising the steps of:

a) providing a control/data bitmap having a number of bitmap storage locations;

b) providing a storage device for storing a block of information, said storage device having a header storage location and a number of information unit storage locations, each information unit storage location corresponding to one of the bitmap storage locations;

c) receiving m-bit information units;

d) storing each control/data indicator of the corresponding received m-bit information units in a corresponding one of the bitmap storage locations;

e) storing the actual information from each of the received m-bit information units in the information unit storage location corresponding to the bitmap storage location in which the control/data indicator was stored for the corresponding received m-bit information unit; and f) thereafter transferring the control/data indicators stored in the bitmap storage locations from the bitmap to the storage device and storing the control/data indicators in the header storage location of said storage device to form the block.

2. A method according to claim 1 wherein the m-bit units are received over a serial line and further comprising the step of:

g) performing a serial to parallel conversion of the received m-bit information units.

3. A method according to claim 2 wherein the step of storing each control/data indicator includes the step of:

h) storing each control/data indicator in a corresponding control/data detect shift register.

4. A method according to claim 3 wherein the step of providing a storage device for storing a block of information is carried out by providing a receive buffer.

5. A method according to claim 4 wherein the step of storing the actual information from each of the received m-bit information units further comprises the steps of:

i) assembling the actual information from four received m-bit information units into a longword;

j) storing the assembled longword in the information unit storage locations corresponding to the bitmap storage locations in which the control/data indicators for the four received m-bit information units were stored; and repeating steps i) and j) for the predetermined number of m-bit information units.

6. A method according to claim 5 wherein the step of storing the control/data indicators further comprises the steps of:

j) forming a header that includes the contents of the control/data detect shift register; and k) storing the header in the header storage location of the receive buffer.

7. A data communication server, comprising:

a serial/parallel converter receiving serial m-bit information units, each m-bit information unit including actual information and a corresponding control/data indicator, the serial parallel converter adapted to convert the serially received m-bit information units to a parallel format;

a latch, coupled to the converter, storing the actual information of each received m-bit information unit;

a shift register, coupled to the converter, for storing the control/data indicator of each of the received m-bit information units, said shift register shifting the control/data indicators for each received m-bit information unit;

a receive buffer for storing a block, coupled to the latch and the shift register, the receive buffer including a header storage location for storing each of the control/data indicators from the shift register, and a plurality of information buffer locations for storing each of the actual information from the latch, said buffer location for each actual information corresponding with a position of its respective control/data indicator in the header location.

8. A data communication server according to claim 7 wherein said latch is capable of storing a longword of actual information formed from four m-bit information units, said longword being sent to the buffer location in the receive buffer in a single operation.

9. A data communication server according to claim 8 further comprising:

a logical channel number register, coupled to the serial/parallel converter, storing a logical channel number contained in a first m-bit information unit.

10. A server according to claim 9 further comprising:

a null detector, coupled to the serial/parallel converter, having a signal output line;

a counter having an input coupled to the signal output line, said null detector sending a signal to increment the value of said counter each time an m-bit information unit contains actual information, the value of said counter being stored in the header storage location in the receive buffer.

11. A data communication server according to claim 10 further comprising a header latch having inputs coupled to outputs of the shift register, the logical channel number register and the counter and an output coupled to the receive buffer.

* * * * *